United States Patent
Hofacker

(10) Patent No.: US 7,473,756 B2
(45) Date of Patent: Jan. 6, 2009

(54) LOW-VISCOSITY OLIGOCARBONATE POLYOLS

(75) Inventor: Steffen Hofacker, Odenthal (DE)

(73) Assignee: Bayer MaterialScience AG (DE)

( * ) Notice: Subject to any disclaimer, the term of this patent is extended or adjusted under 35 U.S.C. 154(b) by 227 days.

(21) Appl. No.: 11/405,248

(22) Filed: Apr. 17, 2006

(65) Prior Publication Data

US 2006/0241267 A1 Oct. 26, 2006

(30) Foreign Application Priority Data

Apr. 22, 2005 (DE) .................. 10 2005 018 691

(51) Int. Cl.
*C08G 64/00* (2006.01)
*C08G 63/02* (2006.01)

(52) U.S. Cl. ............ 528/272; 524/99; 524/445; 524/449; 525/67; 528/26; 528/33; 528/44; 528/196; 528/198

(58) Field of Classification Search .......... 524/99, 524/445, 449; 525/67; 528/26, 33, 44, 196, 528/198

See application file for complete search history.

(56) References Cited

U.S. PATENT DOCUMENTS

| | | | | |
|---|---|---|---|---|
| 3,631,200 | A | 12/1971 | Nehring et al. | 260/463 |
| 4,105,641 | A | 8/1978 | Buysch et al. | 526/712 |
| 5,461,121 | A | 10/1995 | Rosenquist | 525/462 |
| 6,194,596 | B1 | 2/2001 | Josten et al. | 556/437 |
| 6,818,784 | B2 | 11/2004 | Tillack et al. | 558/276 |
| 2001/0021761 | A1* | 9/2001 | Petty et al. | 528/33 |

FOREIGN PATENT DOCUMENTS

| | | |
|---|---|---|
| DE | 857 948 | 12/1952 |
| DE | 1 012 557 | 7/1957 |
| DE | 1 955 902 | 5/1971 |
| EP | 1 035 150 A1 | 9/2000 |
| WO | 98/54242 A1 | 12/1998 |

OTHER PUBLICATIONS

Gunatillake P A et al: "Synthesis and Characterization of a Series of Poly(alkylene carbonate) Macrodiols and the Effect of Their Structure on the Properties of Polyurethanes" Aug. 22, 1998, Journal of Applied Polymer Science, John Wiley and Sons Inc. New York, US, pp. 1621-1633 XP000803565.

* cited by examiner

*Primary Examiner*—Terressa M Boykin
(74) *Attorney, Agent, or Firm*—Connolly Bove Lodge & Hutz LLP

(57) ABSTRACT

The present invention relates to low-viscosity oligocarbonate polyols, their preparation and use. The oligocarbonate polyols are based on diols of formula I below, which are used in combination with a further aliphatic polyol.

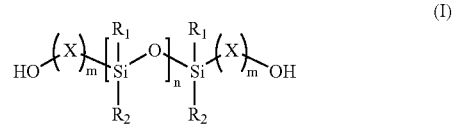

(I)

10 Claims, No Drawings

LOW-VISCOSITY OLIGOCARBONATE POLYOLS

CROSS-REFERENCE TO RELATED APPLICATION

This application claims priority under 35 U.S.C. §119 (a-e) to German application DE 10 2005 018691, filed Apr. 22, 2005.

FIELD OF THE INVENTION

The present invention relates to low-viscosity oligocarbonate polyols, their preparation and use.

BACKGROUND OF THE INVENTION

Oligocarbonate polyols are important precursor products in the context, for example, of the preparation of plastics, coating materials and adhesives. They are reacted, for example, with isocyanates, epoxides, (cyclic) esters, acids or acid anhydrides (DE-A 1 955 902). They can in principle be prepared from aliphatic polyols by reaction with phosgene (e.g. DE-A 1 595 446), bis-chlorocarbonic esters (e.g. DE-A 857 948), diaryl carbonates (e.g. DE-A 1 01 2557), cyclic carbonates (e.g. DE-A 2 523 352) or dialkyl carbonates (e.g. WO 2003/2630).

The oligocarbonate polyols described in the prior art and having a number-average molecular weight ($M_n$) of 500 to 5 000 g/mol are characterized in that they are present at room temperature (23° C.) in the solid aggregate state or else in a viscous, liquid aggregate state. The viscosity range of oligocarbonate polyols which are liquid at room temperature extends, depending on composition and number-average molecular weight, from 2 500 mPas to 150 000 mPas. Viscosities of <3 500 mPas are achieved alone by oligocarbonate polyols which often, as well as carbonate structures, contain ester units and/or have number-average molecular weights ≦1 000 g/mol. In the case of the presence of ester units, however, this results in an adverse effect, in the case for example of polyurethane systems based on so-called polyester carbonate polyols of this kind, on the stability to hydrolysis, in comparison to systems based on pure oligocarbonate polyols. Similar considerations apply to the case where ether-containing oligocarbonate polyols are used, in relation to the poorer UV resistance in relation to systems of the kind based on pure oligocarbonate polyols.

A further means of preparing pure oligocarbonate polyols of low viscosity is to use hydroxyalkyl-terminated silicones. The preparation in principle of such oligocarbonate diols which have exclusively hydroxyalkyl-terminated silicone compounds as their diol component are already known and described in Chem. Ber. (1966), 99 (2), 1368-1383. In the case of the preparation specified there, however, by means of phosgenation, there is no discernible indication that the oligomers or polymers obtained contain exclusively hydroxy-functional end groups. It is apparent, further, that oligocarbonate diols of this kind, based solely on the basis of hydroxyalkyl-terminated silicone compounds, are unsuited to the production of polyurethane coatings, since to a high degree they exhibit incompatibilities with (poly)isocyanates.

Moreover, EP-A 1 035 153, for example, teaches the preparation of polysiloxanes modified with polyester polyols and containing carbonate groups. These are hydroxyalkyl-terminated silicones which have been reacted with polyester polyols and organic carbonic esters to give copolymers. Copolymers of this kind, of whose viscosities no further details have been given, have a similarly negative hydrolysis stability behavior, owing to the presence of ester groups, as the polyester carbonate polyols described earlier on above, and so these copolymers generally find use only as additives in coatings. There is no description concerning carbonates which are free of carboxylic ester groups.

It was an object of the present invention, therefore, to provide oligocarbonate polyols which have a viscosity at room temperature (23° C.), measured in accordance with DIN EN ISO 3219, and as a function of a number-average molecular weight of between 500 and 10 000 g/mol, of less than 15 000 mPas and which do not exhibit the disadvantages recited above.

SUMMARY OF THE INVENTION

It has been found that oligocarbonate polyols comprising structural units derived from a diol of the formula (I) achieve the underlying object.

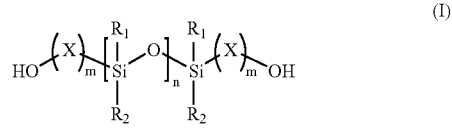

where
n is an integer from 1 to 50,
m is an integer from 1 to 20,
$R_1, R_2$ independently of one another are each a $C_1$- to $C_{20}$-alkyl radical which may be linear, cyclic or branched and is optionally unsaturated, and
$(X)_m$ is a carbon-containing group having 1 to 20 carbon atoms and whose chain may also be interrupted by heteroatoms such as oxygen, sulphur or nitrogen.

Methods of making oligocarbonate polyols based on the above diols by transesterification of organic carbonates are also provided.

DETAILED DESCRIPTION OF PREFERRED EMBODIMENTS

As used herein in the specification and claims, including as used in the examples and unless otherwise expressly specified, all numbers may be read as if prefaced by the word "about", even if the term does not expressly appear. Also, any numerical range recited herein is intended to include all subranges subsumed therein.

The invention accordingly provides aliphatic oligocarbonate polyols having a number-average molecular weight ($M_n$) of 500 to 10 000 g/mol which are synthesized from a polyol component which contains 1 to 99 mol %, based on this polyol component, of diols of the formula (I) and which further includes at least one additional aliphatic polyol constituent, the amounts of the diol of the formula (I) and of the other polyols present adding up to 100 mol %.

Preferably in formula (I)
$(X)_m$ is an alkyl group,
n is an integer from 1 to 20, more preferably 1 to 10,
m is an integer from 1 to 10, more preferably 1 to 5, and
$R_1$, $R_2$ are each methyl, ethyl or propyl, more preferably $R_1=R_2=$methyl Preferably the diols of the formula (I) are present in the aliphatic polyol component at 1 to 90 mol %, more preferably 1 to 75 mol %.

The preparation of hydroxyalkyl-terminated silicone compounds depicted in formula (I) is known and is described for example in Chemie und Technologie der Silicone, 2nd Edition, 1968, Verlag Chemie, Weinheim, Germany.

The invention further provides the preparation of the oligocarbonate polyols of the invention and also coatings, adhesives and sealants, and polyurethane prepolymers, which are based on the oligocarbonate polyols of the invention. Preferred polyurethane-containing coatings are those using the oligocarbonate polyols of the invention as a reactive component with respect to (poly)isocyanates.

The oligocarbonate polyols of the invention can be prepared by a process described in the prior art, such as phosgenation or transesterification.

The oligocarbonate polyols of the invention are prepared preferably by transesterifying organic carbonates such as aryl, alkyl or alkylene carbonates, which are known for their ease of preparation and ready availability, with a polyol component. Examples that may be mentioned include the following: diphenyl carbonate (DPC), dimethyl carbonate (DMC), diethyl carbonate (DEC), ethylene carbonate, etc.

Within the polyol component, besides the diols of formula (I), aliphatic alcohols having 2 to 100 carbon atoms and an OH functionality $\geq 2$ are used. These alcohols may be linear, cyclic, branched, unbranched, saturated or unsaturated and the OH functions can be attached to primary, secondary or tertiary carbon atoms.

Examples that may be mentioned include the following: ethylene glycol, 1,3-propylene glycol, 1,3-butanediol, 1,4-butanediol, 1,5-pentanediol, 1,6-hexanediol, 2-ethylhexanediol, 3-methyl-1,5-pentanediol, cyclohexanedimethanol, trimethylol-propane, pentaerythritol, dimer diol, sorbitol Furthermore, it is also possible for any desired mixtures of the aforementioned aliphatic polyols to be present alongside the compounds of the formula (1) in the polyol component used for the transesterification.

Preferred aliphatic polyols are saturated aliphatic or cycloaliphatic polyols which optionally are branched and have primarily or secondarily attached OH groups and an OH functionality $\geq 2$.

To accelerate the reaction of the organic carbonates with the polyols for use in accordance with the invention it is possible in principle to use all of the transesterification catalysts that are known from the prior art. Possible catalysts in this context include both soluble catalysts (homogeneous catalysis) and heterogeneous transesterification catalysts.

Suitability for preparing the oligocarbonate polyols of the invention is possessed in particular by hydroxides, oxides, metal alkoxides, carbonates and organometallic compounds of main groups I, II, III, and IV of the Periodic Table of the Elements according to Mendeleev, of transition groups III and IV, and also the elements and compounds from the group of the rare earth metals, particularly the compounds of titanium, of zirconium, of lead, of tin, of antimony, of yttrium and of ytterbium.

Mention may be made for example of the following: LiOH, $Li_2CO_3$, $K_2CO_3$, CaO, $TiCl_4$, $Ti(O^iPr)_4$, $Ti(O^iBu)_4$, $Zr(O^iPr)_4$, tin octoate, dibutyltin dilaurate, bis-tributyltin oxide, tin oxalate, lead stearate, $Sb_2O_3$, yttrium(III) acetylacetonate, ytterbium(III) acetylacetonate.

Preference is given to using alkoxide compounds of titanium and/or zirconium, such as $Ti(O^iPr)_4$, $Ti(O^iBu)_4$, $Zr(O^iPr)_4$, organotin compounds such as dibutyltin dilaurate, bistributyltin oxide, dibutyltin oxide, and also acetylacetonate compounds of the rare earth metals such as yttrium(III) acetylacetonate and/or ytterbium(III) acetylacetonate. Very particular preference is given to using yttrium(III) acetylacetonate, ytterbium(III) acetylacetonate and/or titanium tetraisopropoxide.

The catalyst content is 1 to 1 000 ppm, preferably 1 to 500 ppm, more preferably 1 to 250 ppm, based on the amount of the resulting oligocarbonate of the invention.

When the reaction is at an end the catalyst can be left in the product, separated off, neutralized and/or masked. Preferably the catalyst is left in the product. In the case of masking it is preferred to use phosphoric acid and its derivatives, such as $H_3PO_4$, dibutyl phosphate, etc. as masking agents.

To produce polyurethane coatings based on the oligocarbonate polyols of the invention it is possible to use all of the (poly)isocyanates known from the prior art as components which are reactive with respect to hydroxyl groups.

The polyisocyanates which are reactive with respect to hydroxyl groups are any desired polyisocyanates prepared by modifying simple aliphatic, cycloaliphatic, araliphatic and/or aromatic diisocyanates, synthesized from at least two diisocyanates and having a uretdione, isocyanurate, allophanate, biuret, iminooxadiazinedione and/or oxadiazinetrione structure, as described by way of example in, for example, J. Prakt. Chem. 336 (1994) 185-200, publications DE-A 16 70 666, 19 54 093, 24 14 413, 24 52 532, 26 41 380, 37 00 209, 39 00 053 and 39 28 503 or EP-A 336 205, 339 396 and 798 299.

Suitable diisocyanates for preparing such polyisocyanates are any desired diisocyanates of the molecular weight range 140 to 400 which are obtainable by phosgenation or by phosgene-free processes, such as by thermal urethane cleavage, and contain aliphatically, cycloaliphatically, araliphatically and/or aromatically attached isocyanate groups, such as 1,4-diisocyanatobutane, 1,6-diisocyanatohexane (HDI), 2-methyl-1,5-diisocyanatopentane, 1,5-diisocyanato-2,2-dimethylpentane, 2,2,4- and/or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3)-isocyanatomethylcyclohexane, bis(isocyanatomethyl)norbornane, 1,3- and 1,4-bis(2-isocyanatoprop-2-yl)benzene (TMXDI), 2,4- and 2,6-diisocyanatotoluene (TDI), 2,4'- and 4,4'-diisocyanatodiphenylmethane (MDI), 1,5-diisocyanatonaphthalene or any desired mixtures of such diisocyanates.

The polyisocyanates or polyisocyanate mixtures in question are preferably those of the stated kind containing exclusively aliphatically and/or cycloaliphatically attached isocyanate groups.

Very particular preference is given to polyisocyanates and/or polyisocyanate mixtures with an isocyanurate structure, based on HDI, IPDI and/or 4,4'-diisocyanatodicyclohexylmethane.

Furthermore, it is also possible to use what are known as blocked polyisocyanates and/or isocyanates, preferably blocked polyisocyanates and/or polyisocyanate mixtures, more preferably blocked polyisocyanates and/or polyisocyanate mixtures having an isocyanurate structure and being based on HDI, IPDI and/or 4,4'-diisocyanatodicyclohexylmethane.

The blocking of (poly)isocyanates for temporary protection of the isocyanate groups is a working method which has been known for a long time and is described for example in Houben Weyl, Methoden der organischen Chemie XIV/2, pp. 61-70.

Examples of suitable blocking agents include all compounds which can be eliminated when the blocked (poly)

isocyanate is heated, in the presence where appropriate of a catalyst. Suitable blocking agents are, for example, sterically bulky amines such as dicyclohexylamine, diisopropylamine, N-tert-butyl-N-benzylamine, caprolactam, butanone oxime, imidazoles having the various conceivable substitution patterns, pyrazoles such as 3,5-dimethylpyrazole, triazoles and tetrazoles, and also alcohols such as isopropanol and ethanol. Besides this there is also the possibility of blocking the isocyanate group in such a way that in the case of continued reaction, rather than the blocking agent being eliminated, the intermediate form is consumed by reaction. This is the case in particular with cyclopentanone 2-carboxyethyl ester, which in the thermal crosslinking reaction is incorporated fully by reaction into the polymeric network and is not eliminated again.

Catalysts used for the reaction of the oligocarbonate polyols of the invention and of the above-described (poly)isocyanate component can be catalysts such as commercially customary organometallic compounds of the elements aluminium, tin, zinc, titanium, manganese, iron, bismuth or else zirconium, such as dibutyltin dilaurate, zinc octoate, titanium tetraisopropoxide. In addition, however, tertiary amines, such as 1,4-diazabicyclo[2.2.2]octane, are also suitable.

A further possibility is to accelerate the reaction of the oligocarbonate polyols of the invention with the (poly)isocyanate component by carrying out said reaction at temperatures between 20 and 200° C., preferably between 40 and 180° C.

Besides the use of the oligocarbonate polyols of the invention alone it is also possible to use mixtures of the oligocarbonate polyols of the invention and further compounds that are reactive with respect to (poly)isocyanate, such as polyether polyols, polyester polyols, polyacrylate polyols, polyamines, aspartates, etc.

The ratio of (poly)isocyanate component to the component which is reactive with respect to the isocyanate group is set so as to result in an equivalent ratio of the free and optionally blocked NCO groups to the component that is reactive with respect to the isocyanate group of 0.3 to 2, preferably 0.4 to 1.5, more preferably 0.5 to 1.2.

In addition, the polyurethane coatings of the invention may comprise the auxiliaries which are typical in coatings technology, such as organic or inorganic pigments, further organic light stabilizers, free-radical scavengers, coatings additives, such as dispersants, flow control agents, thickeners, defoamers and other assistants, adhesion agents, fungicides, bactericides, stabilizers or inhibitors and further catalysts.

Coating compositions of this kind according to the invention may find application for example in the fields of the coating of plastics, the interior and exterior coating of cars, floor coating, balcony coating and/or wood/furniture coating.

EXAMPLES

The hydroxyl number (OHZ) was determined in accordance with DIN 53240-2.

The number-average molecular weight ($M_n$) results arithmetically from the relationship, known to the skilled person, between hydroxyl number and theoretical hydroxyl functionality.

The viscosity was determined by means of the "RotoViscol" rotational viscometer from Haake, Germany in accordance with DIN EN ISO 3219.

Unless otherwise indicated, the temperature details stated in the examples below relate in each case to the liquid-phase temperature of the reaction mixture.

Inventive Example 1

Preparation of an Inventive Oligocarbonate Polyol

A 1 l three-necked flask with stirrer and reflux condenser was charged with 139.5 g (75 mol %) of 1,6-hexanediol and 223.0 g (25 mol %) of Baysilone® OF/OH 502 6% (GE-Bayer Silicones, Germany) under a nitrogen atmosphere and this initial charge was dewatered at 110° C. under a pressure of 20 mbar for 2 h. Baysilone® OF/OH 502 6% is a hydroxyalkyl-functional (α,ω-carbinol) polydimethylsiloxane. The charge in the flask was then blanketed with nitrogen, 0.008 g of titanium tetraisopropoxide and also 194.7 g of dimethyl carbonate were added, and the reaction mixture was held under reflux (110° C. oil bath temperature) for 24 h. The reflux condenser was then swapped for a Claisen bridge and the methanol cleavage product formed was distilled off together with dimethyl carbonate still present. For this purpose the temperature was raised over the course of 2 hours from 110° C. to 150° C. and on reaching that temperature was maintained for 4 h. Thereafter the temperature was raised to 180° C. over the course of 2 h and, when it had reached that point, was maintained for a further 4 h. Subsequently the reaction mixture was cooled to 100° C. and a stream of nitrogen (2 l/h) was passed into the reaction mixture. In addition, the pressure was gradually lowered to 20 mbar, so that the overhead temperature during the ongoing distillation did not exceed 60° C. When 20 mbar were reached, the temperature was increased to 130° C. and held there for 6 h. Aeration and cooling gave an oligocarbonate diol which was liquid at room temperature and had the following characteristics:

| | |
|---|---|
| Hydroxyl number (OHZ): | 36.9 mg KOH/g |
| Viscosity at 23° C., D:16: | 1 450 mPas |
| Number-average molecular weight ($M_n$): | 3 035 g/mol |

Comparative Example 1

Preparation of an Oligocarbonate Ester Polyol Liquid at Room Temperature

A 2 l three-necked flask with stirrer and reflux condenser was charged with 461.4 g (50 mol %) of 1,6-hexanediol under a nitrogen atmosphere and this initial charge was dewatered at 110° C. under a pressure of 20 mbar for 2 h. The charge in the flask was then blanketed with nitrogen, at 60° C. 0.08 g of titanium tetra-isopropoxide and also 446.6 g (50 mol %) of ε-caprolactone were added, and the mixture was heated to 80° C. and held there for 2 h. Thereafter 482.4 g of dimethyl carbonate were added, and the reaction mixture was held under reflux (110° C. oil bath temperature) for 24 h. The reflux condenser was then swapped for a Claisen bridge and the methanol cleavage product formed was distilled off together with dimethyl carbonate still present. For this purpose the temperature was raised over the course of 2 hours from 110° C. to 150° C. and on reaching that temperature was maintained for 4 h. Thereafter the temperature was raised to 180° C. over the course of 2 h and, when it had reached that point, was maintained for a further 4 h. Subsequently the reaction mixture was cooled to 150° C. and a stream of nitrogen (2 l/h) was passed into the reaction mixture. In addition, the pressure was gradually lowered to 20 mbar, so that the overhead temperature during the ongoing distillation did not exceed 60° C. When 20 mbar were reached, the temperature was increased to 180° C. and held there for 6 h. Aeration and cooling gave an oligocarbonate diol which was liquid at room temperature and had the following characteristics:

| | |
|---|---|
| Hydroxyl number (OHZ): | 34.8 mg KOH/g |
| Viscosity at 23° C., D:16: | 73 300 mPas |
| Number-average molecular weight ($M_n$): | 3 218 g/mol |

Comparative Example 2

Preparation of an Oligocarbonate Ether Polyol Liquid at Room Temperature

A 5 l three-necked flask with stirrer and reflux condenser was charged with 2 788.6 g (100 mol %) of Poly-THF® 250 (BASF AG, Germany) under a nitrogen atmosphere and this initial charge was dewatered at 110° C. under a pressure of 20 mbar for 2 h. The charge in the flask was then blanketed with nitrogen, 0.6 g of ytterbium(III) acetylacetonate and also 1 098.5 g of dimethyl carbonate were added, and the reaction mixture was held under reflux (110° C. oil bath temperature) for 24 h. The reflux condenser was then swapped for a Claisen bridge and the methanol cleavage product formed was distilled off together with dimethyl carbonate still present. For this purpose the temperature was raised over the course of 2 hours from 110° C. to 150° C. and on reaching that temperature was maintained for 4 h. Thereafter the temperature was raised to 180° C. over the course of 2 h and, when it had reached that point, was maintained for a further 4 h. Subsequently the reaction mixture was cooled to 130° C. and a stream of nitrogen (2 l/h) was passed into the reaction mixture. In addition, the pressure was gradually lowered to 20 mbar, so that the overhead temperature during the ongoing distillation did not exceed 60° C. When 20 mbar were reached, the temperature was increased to 180° C. and held there for 6 h. Aeration and cooling gave an oligocarbonate diol which was liquid at room temperature and had the following characteristics:

| | |
|---|---|
| Hydroxyl number (OHZ): | 35.4 mg KOH/g |
| Viscosity at 23° C., D:16: | 17 800 mPas |
| Number-average molecular weight ($M_n$): | 3 160 g/mol |

Comparative Example 3

Preparation of a Pure Oligocarbonate Polyol

Same procedure as in Comparative Example 2 except that instead of Poly-THF® 250 2 149.6 g (100 mol %) of 1,6-hexanediol and also 2 340.6 g of dimethyl carbonate and 0.52 g of ytterbium(III) acetylacetonate were used as starting materials. Aeration and cooling gave an oligocarbonate diol which was waxlike at room temperature and had the following characteristics:

| | |
|---|---|
| Hydroxyl number (OHZ): | 39.8 mg KOH/g |
| Viscosity at 23° C., D:16: | not determinable - waxlike solid |
| Number-average molecular weight (Mn): | 2 800 g/mol |

Comparative Example 4

Preparation of a Liquid, Pure Oligocarbonate Polyol

Same procedure as in Comparative Example 2 except that instead of Poly-THF® 250 1 909.8 g (100 mol %) of 3-methyl-1,5-pentanediol and also 2 027.8 g of dimethyl carbonate and 0.46 g of ytterbium(III) acetylacetonate were used as starting materials. Aeration and cooling gave an oligocarbonate diol which was waxlike at room temperature and had the following characteristics:

| | |
|---|---|
| Hydroxyl number (OHZ): | 56.2 mg KOH/g |
| Viscosity at 23° C., D:16: | 72 000 mPas |
| Number-average molecular weight (Mn): | 2 000 g/mol |

Comparative Example 5

Preparation of a Low-Viscosity, Pure Oligocarbonate Polyol

Same procedure as in Comparative Example 2 except that in a 1 l three-necked flask instead of poly-THF® 250 251.8 g (100 mol %) of Baysilone® OF/OH 502 6% (GE-Bayer Silicones, Germany) and also 42.5 g of dimethyl carbonate and 0.05 g of ytterbium(III) acetylacetonate were used as starting materials. Aeration and cooling gave an oligocarbonate diol which was liquid and of low viscosity at room temperature and had the following characteristics:

| | |
|---|---|
| Hydroxyl number (OHZ): | 58.5 mg KOH/g |
| Viscosity at 23° C., D:16: | 17 mPas |
| Number-average molecular weight (Mn): | 1 900 g/mol |

Inventive Example 2

Production of an Inventive Polyurethane Coating

The inventive oligocarbonate diol prepared in Inventive Example 1 was mixed with Desmodur® Z 4470 (IPDI-based polyisocyanate, Bayer MaterialScience AG, Leverkusen, Germany) in an equivalent ratio of 1:1.1 with the further addition of 50 ppm of dibutyltin dilaurate in a glass beaker, after which the homogeneous mixture was applied by knife coating to a glass plate. The coating was then cured at 140° C. for 30 minutes. This gave a clear polyurethane film of high transparency.

Comparative Example 6

Production of a Polyurethane Coating

Same procedure as in Inventive Example 2, with the difference that the oligocarbonate diol used was that prepared in Comparative Example 5. The resulting mixture was turbid and showed phase separation. It was not possible to produce a polyurethane coating.

As is apparent from comparing Inventive Example 1 with Comparative Examples 1 to 4, the oligocarbonate polyol of the invention has a much lower viscosity for the same or even higher molecular weight without harboring the disadvantages of an ester structure or ether structure.

Furthermore, a comparison of Inventive Example 2 with Comparative Example 6 shows that only with the oligocar-

What is claimed is:

1. A transparent coating comprising aliphatic oligocarbonate polyols having a number-average molecular weight ($M_n$) of 500 to 10,000 g/mol and which are prepared from
a polyol component containing
1 to 99 mol % of a diol of formula (I)

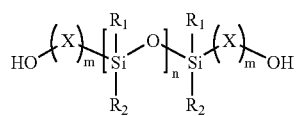

wherein
n is an integer from 1 to 50;
m is an integer from 1 to 20;
$R_1$ and $R_2$ are, independently of one another, an optionally unsaturated, linear, cyclic, or branched $C_1$- to $C_{20}$-alkyl radical;
(X)m is a carbon-containing group having 1 to 20 carbon atoms and whose chain may also be interrupted by heteroatoms such as oxygen, sulphur or nitrogen; and
at least one further aliphatic polyol;
wherein the amounts of said diol of formula (I) and said at least one further aliphatic polyol total 100 mol % of said polyol component.

2. The transparent coating of claim 1, wherein said transparent coating is a polyurethane coating.

3. The transparent coating of claim 2, wherein said polyurethane coating is prepared from an isocyanate or a polyisocyanate.

4. The transparent coating of claim 3, wherein said polyisocyanate is prepared by modifying simple aliphatic, cycloaliphatic, araliphatic, and/or aromatic diisocyanates which comprise at least two diisocyanates having a uretdione, isocyanurate, allophanate, biuret, iminooxadiazinedione, and/or oxadiazinetrione structure.

5. The transparent coating of claim 4, wherein said polyisocyanate comprises an isocyanurate structure and is based on HDI, IPDI, and/or 4,4'diisocyanatodicyclohexylmethane.

6. The transparent coating of claim 3, wherein said polyisocyanate is blocked.

7. The transparent coating of claim 1, wherein said transparent coating is prepared using a catalyst.

8. The transparent coating of claim 3, wherein said transparent coatings are further prepared from polyisocyanate-reactive compounds selected from the group consisting of polyether polyols, polyester polyols, polyacrylate polyols, polyamines, and aspartates.

9. The transparent coating of claim 3, wherein said transparent coatings are prepared with an equivalent ratio of NCO to OH groups in the range of from 0.3 to 2.

10. The transparent coating of claim 1, wherein said transparent coatings are prepared by curing at temperature in the range of from 20° C. to 200° C.

* * * * *